Figure 1:
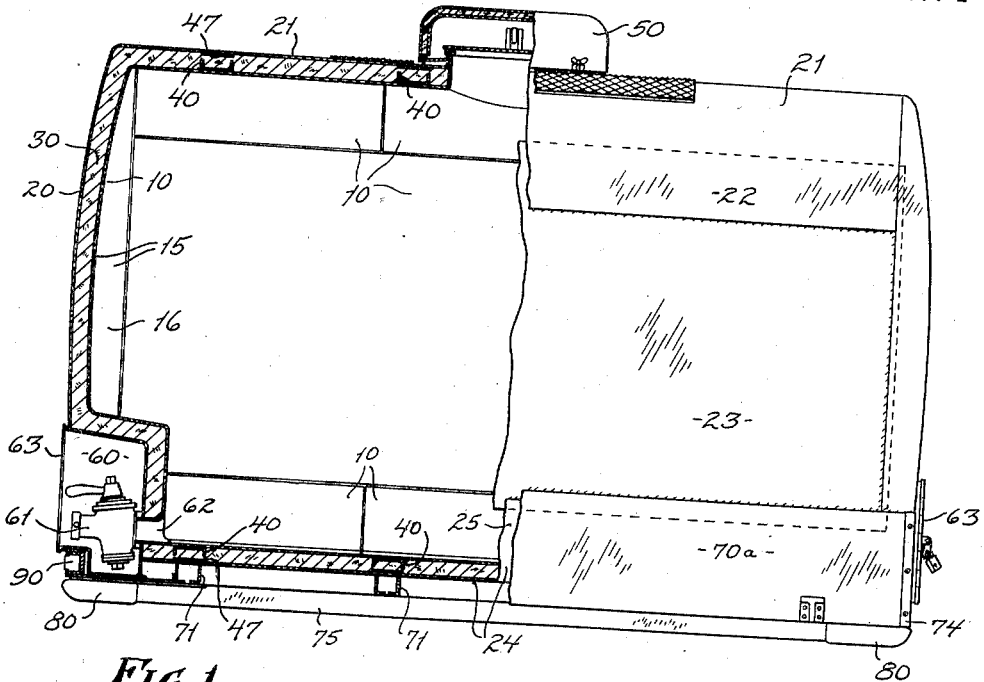

April 8, 1941.  R. A. NORBOM  2,237,310
DEMOUNTABLE FREIGHT CONTAINER FOR LIQUIDS
Original Filed Jan. 4, 1938  3 Sheets-Sheet 1

INVENTOR
Ragnar A. Norbom
BY
Bates, Goldrick & Teare
ATTORNEYS

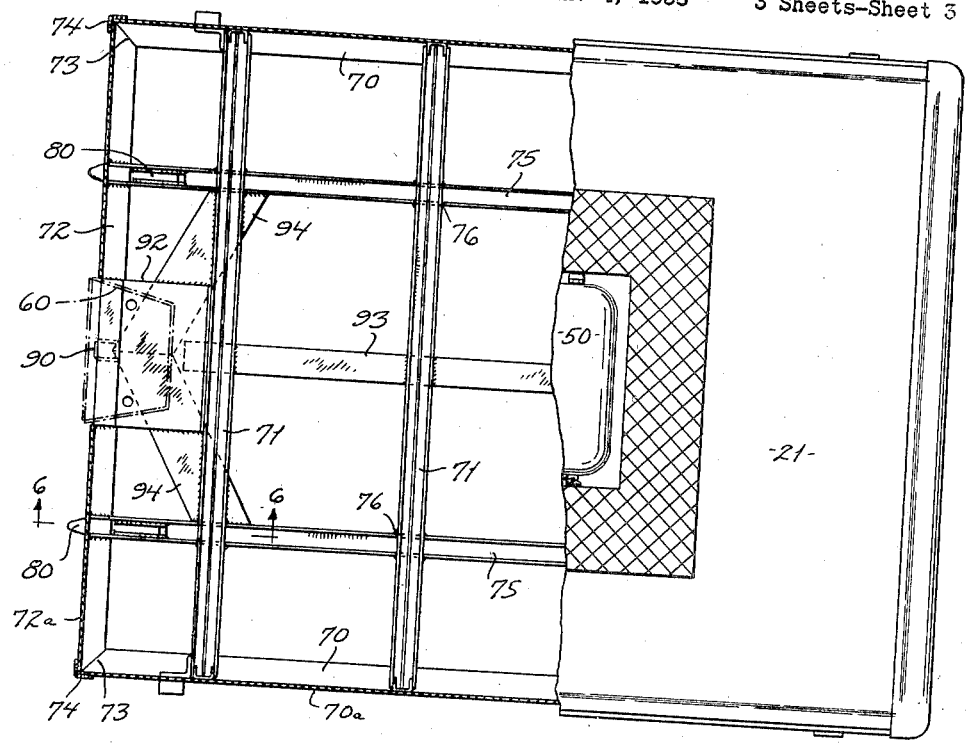
Fig. 5
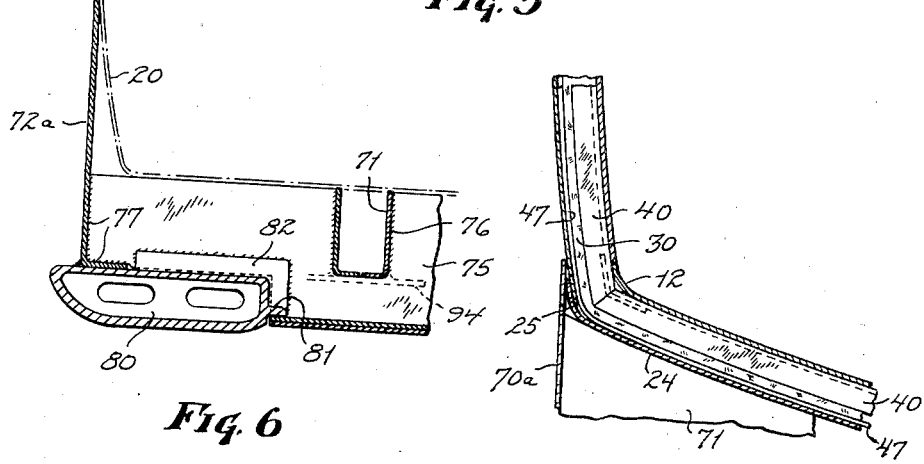
Fig. 6
Fig. 7

Patented Apr. 8, 1941

2,237,310

UNITED STATES PATENT OFFICE 2,237,310

DEMOUNTABLE FREIGHT CONTAINER FOR LIQUIDS

Ragnar A. Norbom, Clifton, N. J., assignor, by mesne assignments, to National Fitch Corporation, New York, N. Y., a corporation of Delaware Original application January 4, 1938, Serial No. 183,273. Divided and this application December 9, 1938, Serial No. 244,716

8 Claims. (Cl. 280—5)

This invention relates to a demountable tank body comprising a horizontal tank and a supporting cradle arranged to be slid as a unit from one vehicle to another, such as from a highway truck to a railway vehicle or vice versa, or between a vehicle and a shipper's platform. My tank preferably has a double shell with intermediate insulation, and is well adapted for the carrying of milk, but may be used for various other commodities. The tank is mounted on supporting bolsters which are secured to the under-portion of the outer shell, these bolsters carrying parallel skid rails whereby the whole tank construction may be readily shifted from one support to another.

If desired, the tank proper may constitute the intermediate portion of a body designed for carrying liquid in bulk, and also for carrying a number of comparatively small independently removable containers, such as, for instance, ordinary milk cans.

The present invention is concerned particularly with the cradle or floor frame which is united to the tank proper and forms an integral part of the tank body, enabling it to be readily shoved from one place to another, and conveniently supported on the transporting vehicle.

The present application is a division of my copending application No. 183,273, filed January 4, 1938, for a "Demountable freight container for liquids," and showing the structure of the present invention, but in its claims relating to the tank per se.

The particular features of the invention will be apparent from the following description of preferred embodiments illustrated in the drawings.

Figure 2:
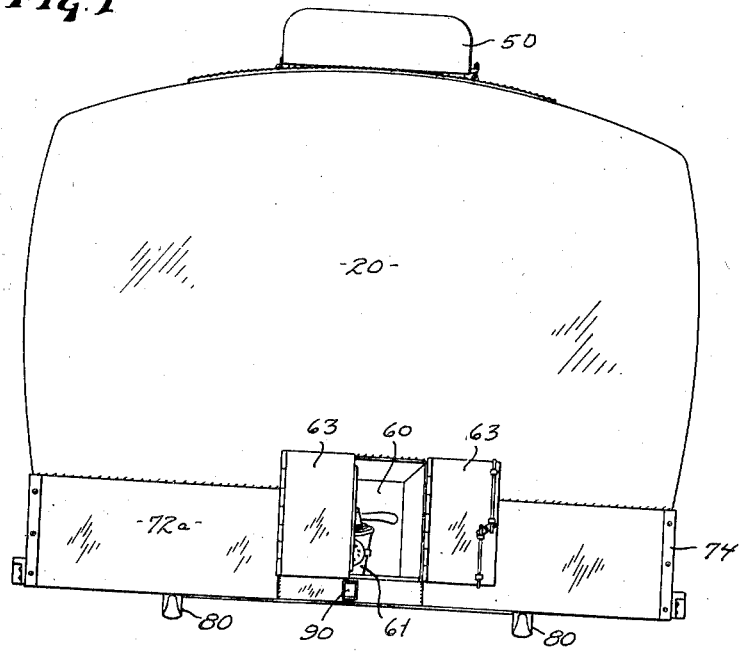
Figure 3:
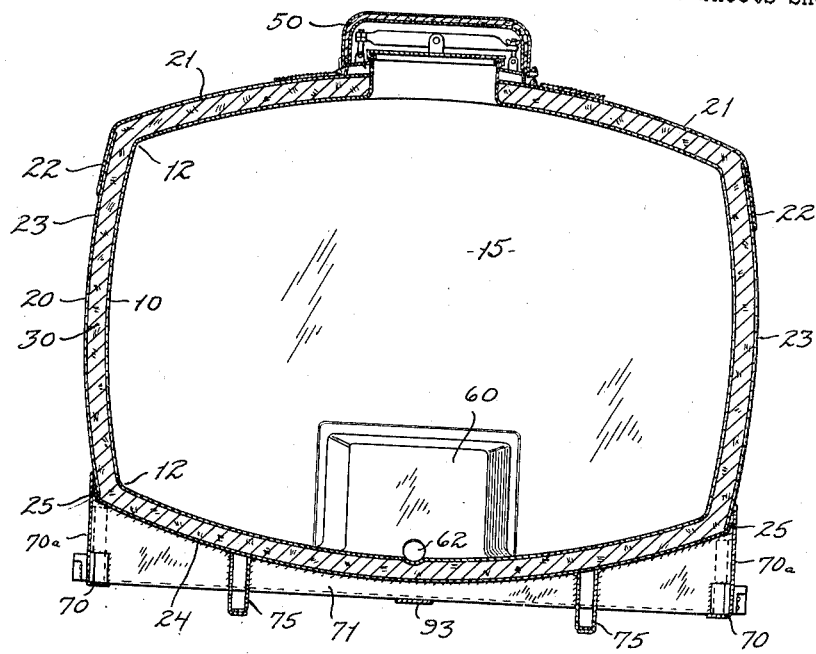
Figure 4:
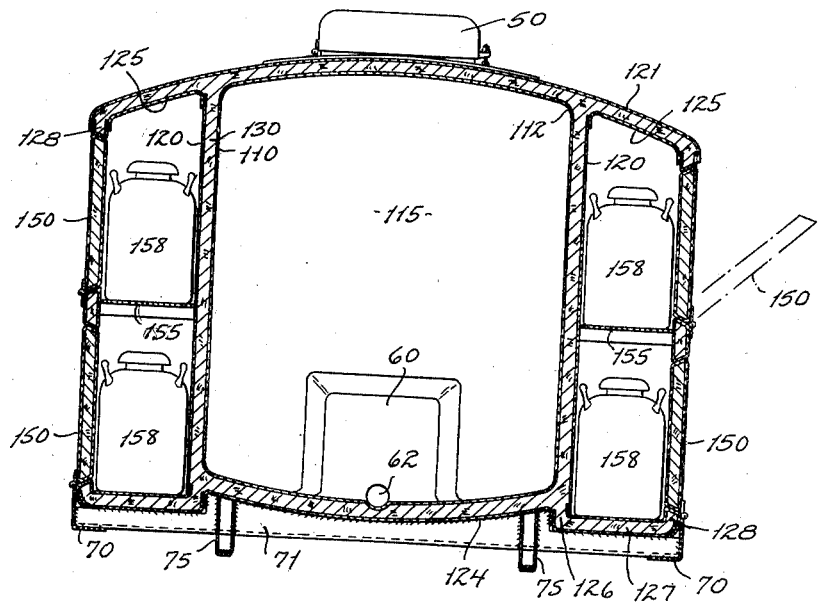

Fig. 1 is a side elevation partly in section, of a full size tank body embodying this invention; Fig. 2 is an end view thereof; Fig. 3 is a vertical section on a plane parallel with Fig. 2; Fig. 4 is a vertical section of a modified form of a tank body formed with compartments on each side for carrying removable containers; Fig. 5 is a plan of the tank body broken away to illustrate the bolster frame; Fig. 6 is a detail illustrating the skid rail and shoe, being a vertical section on the line 6—6 on Fig. 5; Fig. 7 is an enlarged vertical section broken away through the two walls of the tank adjacent the lower corner thereof.

While the present invention is not concerned with the specific construction of the tank itself, except insofar as the tank is united with the base frame, nevertheless, it is convenient to describe first the tank, as shown in the drawings, after which I will set out specifically the nature of the floor frame, which is combined with the tank to form a readily transferable unitary structure.

The tank proper of the embodiment shown in Figs. 1, 2 and 3 is of approximately rectangular form in cross-section, but with each wall bowed outwardly as illustrated in Fig. 3. This rectanguloidal tank has an inner metal wall 10, and an outer wall 20, and an intermediate insulation 30.

The inner wall of the tank may be composed of sheets in edge abutment welded together and providing a smooth, uninterrupted interior for the full height of the tank. Convex heads 15, flanged at their edges as at lines 16 in Fig. 1, have abutting engagement with the ends of the sides, top and bottom, to which they are welded.

The curved surface 12 at the junction of the sides with the top and bottom, and the curved surface 16 at the junction of sides, top and bottom with the ends eliminate any abrupt junction within the tank, allowing it to be readily cleaned.

On its outer side the inner shell may be braced by channel-shaped bars 40, which in their complete form embrace the inner shell and are welded to it.

The outer shell is composed essentially of sides, bottom, top and ends located parallel with the inner shell. As shown, the top plate 21, Fig. 3, has downwardly extending side flanges 22 which overlap the side plates 23, and the bottom plate 24 has upwardly extending flanges 25 overlapping the side plates 23. The side plates, top and bottom plates are welded together with these overlapping flanges.

Contacting with the inner face of the outer shell are flat straps 47 having a width corresponding to the channel braces 40 of the inner shell, extending completely about the interior of the outer shell in registration with the channels on the inner shell.

The intermediate insulation between the shells may comprise blocks of cork, or similar material, so shaped as to practically fill the space between the shells and be somewhat compressed when the outer shell is put in place.

The top shell, at the top of the tank, may be provided with a man-hole, designated generally 50, and at one or both ends, near the bottom, with a pocket 60 formed by inwardly diverting the walls and which contains the discharge valve. These features, however, are not specifically concerned with the present invention.

As illustrated, it will be seen that, disregarding the man-hole entrance and the pocket exit, my tank is of approximately rectangular form, and at the same time, is outwardly bowed at the top, bottom, sides and ends. By this means, I materially increase the cubic capacity of the tank, over that of the usual elliptical tank, and at the same time, I provide a structure which has material advantages over a tank having straight surfaces, as the stresses from the surging of the contents in transit are better resisted; also the tank is more readily adaptable for cleaning at the junctions of the various walls.

The tank, of any suitable form, but preferably as above described, is carried on a suitable bolster frame which is welded to the bottom plate 24 of the outer wall of the tank. This bolster frame is shown in Figs. 1, 3 and 5, and is made up of longitudinal side sills 70, consisting of angle bars, transverse bolsters 71, each in the form of two angle bars facing each other and with their bases resting on the horizontal flanges of the angle bars 70. The side bars 70 are connected by end sills 72, also inwardly facing angle bars, which form mitered joints with the side sills at 73. There may also be external reinforcing caps 74 at the corners. The top edges of the transverse angle bars 71 are concave of a curvature corresponding to that of the bottom of the tank and are welded directly to the bottom plate 24 so that each bolster in effect forms a box girder across the tank. The vertical flanges 70a and 72a on the side and end sills are extended to a sufficient height to constitute skirts leading from the bottom of the base frame to the outer shell of the tanks and protecting the base frame from snow and dirt.

Between the successive bolsters 71 are welded longitudinal members 75 of effective U-shape, though composed of two angle beams facing each other and with the horizontal flange of one on top of the flange of the other. These members rise to the full height of the bolsters at that location and extend well below them as indicated in Fig. 3. These U-shaped members in effect extend from end to end of the base frame, but are periodically notched to receive the bolsters as indicated in Fig. 6. At these notches, end surfaces of the U-shaped bar 75 abut the outer faces of the bolsters and are welded to them as shown at 76. The ends of these longitudinal sills extend over the horizontal flanges and abut the vertical flanges at the end sills 72, and they are welded to both the horizontal and vertical portion of such sills, as indicated at 77. It will be seen that this makes a very firm construction and produces a light and at the same time rigid base frame.

The depending portions of the longitudinal members 75 of the base frame form skid rails for the tank, and to this end I mount in each of these members at its ends a cast steel shoe 80, which extends below the bottom of the U-shaped member, and is thus able to support the tank in four regions adjacent its two ends. As shown in Fig. 6, the shoe lies between the vertical flanges of the U-shaped member 75, and reaches from flange to flange, and has a projecting portion 81 overlapping and resting on the upper horizontal flange of one of the angle beams of member 75. Flanges 82 rise from the shoe and are welded to the side walls of the member. This shoe is likewise welded to the under side of the horizontal flange of the end sill 72. The shoe is thus very effectively held in place.

In the travel of the tank body from one vehicle to another, it is pushed or pulled by a suitable bar attached to the end of the base frame. To effect this attachment, I have secured a steel pocket member 90 to the center of each end sill; I reinforce the end sill at this region by gusset plates 92, the gusset plates at the opposite ends being connected by a longitudinal strap 93 and each gusset plate being connected by two diagonal straps 94 to the longitudinal U-shaped bars 75. Thus, the stresses of pushing the tank body or pulling it from one vehicle or platform to another will be effectively distributed throughout the base frame.

For certain classes of work, particularly in the transportation of milk, it is sometimes desirable to narrow the tank and make provision at its opposite sides for carrying individual milk tanks. Such a construction is illustrated in Fig. 4, where the tank proper has an inner wall 110, and outer wall 120, and intermediate insulation 130, and inner and outer ends 115. The outer side of the inner shell 110 is braced by channel-shaped brace bars and straps similar to the bars 40 and straps 47 described in connection with Fig. 1. The inner shell is composed of plates curved at the corners as at 112, and abutted and welded similarly to that heretofore described. The tank proper, as thus provided, has an entrance man-hole feature 50, and exit pocket feature 60, the same as in the other embodiment.

In the construction shown in Fig. 4, the top plate 121 of the outer shell continues beyond the side walls of the tank proper, and extensions are made of the outer shell 120 at its top outwardly in parallelism with the inner shell, as shown at 125. The side wall of the tank proper continues below the base portion 124 as shown at 126, and then extends outwardly horizontally at 127. At the ends of the top extension 125 and the bottom extension 127 is an outer skeleton wall frame 128 carrying suitable doors. The outer wall of the tank proper in this instance is preferably flat, and thus parallel with the outer frame 128.

It will be seen that the arrangement just described provides a compartment at each side of the tank proper. This is preferably made double-deck by an intermediate platform 155, and enables the mounting of four horizontal rows of individual milk tanks 158. These may be readily put in place and removed through the openings in the side walls 128 normally closed by insulating doors 150, which are indicated as mounted on horizontal hinge axes at their lower edges.

The side compartments of the embodiment being described rest on and are carried by the bolsters 71, the flanges of which are cut down adjacent the ends to provide space for such compartments, as shown. The intermediate portions of the bolsters are the same as heretofore described, and such intermediate portion is provided with longitudinal intermediate U-shaped rails, which carry skid shoes, and there is the push-and-pull bar socket with its reinforced gussets, all of the same form as heretofore described.

The external dimensions of the tank shown in Fig. 4 may be substantially the same as that shown in Fig. 3, and the skid rails have the same spacing, so that this compartmented tank body may be mounted on the vehicle interchangeably with the single-compartment tank of Fig. 3.

At one, or both ends of the tanks of Figs. 3 and 4, near the bottom, I have provided a pocket 69 formed by diverting inwardly the end wall of the tank, both the inner and outer shell, and the insulation as shown in Fig. 1. In this pocket, I have mounted a suitable discharge valve 61 connected by a conduit 62 at the interior of the tank. A pair of hinged doors 63 normally close this pocket, these doors being hinged to the end skirt. The construction in this regard is substantially the same for both types of tank.

I claim:

1. In a demountable tank body, the combination of a base frame having transverse bolsters, a tank resting on the top of the bolsters, U-shaped longitudinal beams forming part of the base frame, skid shoes set into the ends of the beams and secured thereto and extending below the beams, said skid shoes having portions overlapping the bottom of the beams.

2. A base frame for a tank body comprising a pair of parallel longitudinal beams of inverted U-shape, skid shoes carried by said beams adjacent their ends, the side webs of the beams being downwardly notched from the top, and transverse bolsters set into said notches and secured to said beams and adapted to support a tank.

3. The combination of a base frame comprising a pair of parallel longitudinal beams of inverted U-shape, skid shoes carried by said beams adjacent their ends, the side webs of the beams being downwardly notched from the top, transverse bolsters of inverted U-shape set into said notches, and a tank resting on the base frame and having a lower sheet contacting with the tops of the webs of the bolsters and welded thereto.

4. A base frame for a tank body comprising a pair of parallel longitudinal beams of inverted U-shape, skid shoes carried by said beams adjacent their ends, the side webs of the beams being downwardly notched from the top, transverse bolsters of inverted U-shape set into said notches, and upright sheets extending across the ends of the bolsters and secured to them and flanged beneath them to form side sills.

5. The combination of a base frame for a tank body comprising a pair of parallel longitudinal beams of inverted U-shape, the side webs of the beams being downwardly notched from the top, transverse bolsters set into said notches and made of vertical plates with bottom flanges facing each other, and a tank resting on the base frame and having its lower sheet contacting with the tops of the webs of the bolsters and welded thereto, and upright sheets extending across the ends of the bolsters and secured to them, said sheets extending above the bolster webs to overlap the tank resting on the bolster.

6. A demountable body for carrying liquids, the combination of a bolster frame comprising side and end sills and transverse bolsters, a tank resting on the top of the bolsters, longitudinal intermediately located beams intersecting the bolsters, skid shoes carried by said beams, a device located centrally for the attachment of a push-and-pull bar, diagonal braces carrying stresses from said device to the longitudinal members carrying the skid shoes.

7. In a demountable tank body, the combination of a base frame having transverse bolsters, longitudinal skid rails, a center socket for the engagement of a push-and-pull bar, a gusset plate for the socket, straps from the gusset plate to the longitudinal beams carrying the skid rails, and a tank resting on and secured to the bolsters.

8. The combination of a base frame having transverse bolsters with vertical webs concave at the top, and a tank having outwardly convex side wall plates and an outwardly convex bottom member, said bottom member resting directly on the top of the bolsters and welded thereto, said bottom member terminating in edges overlapping the plates of the nearly vertical outwardly convex side walls, side sills secured to the ends of the bolsters, and upright side skirts adding depth to the side sills and extending above the overlapping region of the bottom and side plates of the tank and secured to the tank.

RAGNAR A. NORBOM.